Dec. 20, 1966  R. W. WHITE  3,292,542
ZONING OF A SOLID PROPELLANT MISSILE
Filed Oct. 6, 1964
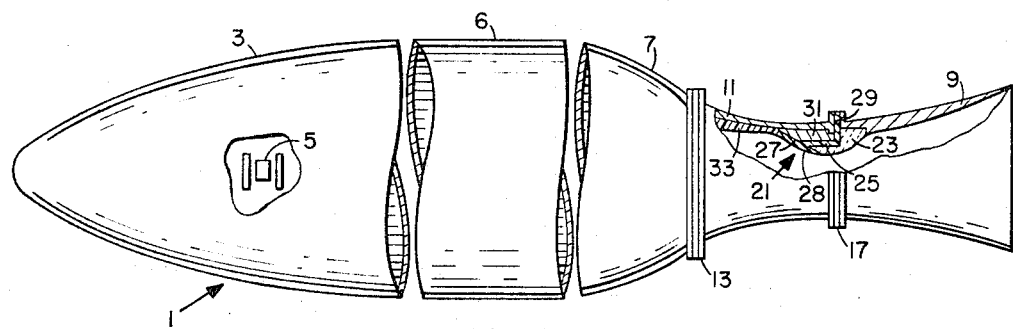
FIG. I
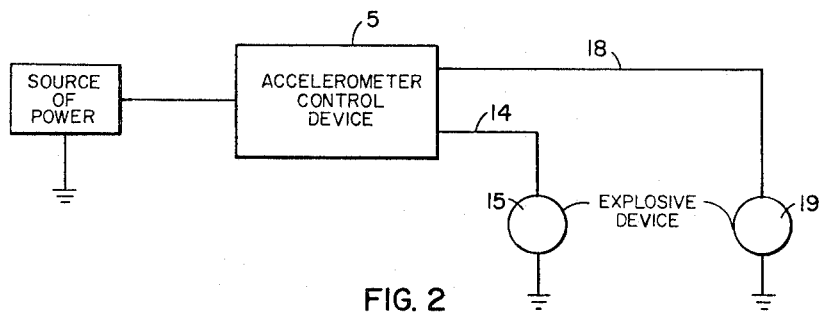
FIG. 2
Richard W. White,
INVENTOR.
BY Harry M. Saragovitz
Edward J. Kelly
Herbert Berl
James L. Deaton

United States Patent Office 3,292,542
Patented Dec. 20, 1966

3,292,542
ZONING OF A SOLID PROPELLANT MISSILE
Richard W. White, Madison, Ala., assignor to the United States of America as represented by the Secretary of the Army
Filed Oct. 6, 1964, Ser. No. 402,038
10 Claims. (Cl. 102—49)

The invention described herein may be manufactured and used by or for the Government for governmental purposes without the payment of any royalty thereon.

This invention relates to ballistic missiles and particularly to thrust zoning of a solid propellant free flight missile which utilizes thrust termination from a reduced operating pressure level.

As the range over which missiles are fired increases, the problem of accuracy in delivering a payload to a preselected target has become more critical. It is well known that lateral accuracy of the missile, or deviation from the target in a line perpendicular to the trajectory path, is not too great a problem for an aerodynamically stable missile. However, due to unavoidable variations in the initial velocity of rocket boosted missiles due to the rocket motor performance, the longitudinal accuracy of the missiles or deviation from the target along the trajectory path, is a problem which this invention proposes to solve.

Attempts in the past to vary the thrust and impulse during flight of solid propellant rocket motors have made use of the clustering of solid propellant rocket motors. Clustering of motors gave variable thrust and impulse by varying the number of rocket motors and intervals of time at which the rocket motors were ignited. Variations in ignition time and the added hardware weight due to clustering resulted in compromising the accuracy and maximum range capability of any missile that used the clustered motor concept. Attempts have been made to vary the thrust and impulse during flight of solid propellant motors by casting two different propellants in the same motor case. Two propellants with different burning rates and surface areas loaded concentrically or end to end in a common motor case will produce a dual thrust solid propellant rocket motor. The disadvantages of this design are that the time of thrust change for continuous burning is restricted to a preset time determined by the motor design. The magnitude of the initial to final thrust rates is limited to the range in burning rates and surface areas obtainable. Present day technology allows a thrust ratio of approximately 7:1. Motor processing difficulties are encountered in the manufacture of such motors, and the performance of the propellants are compromised to obtain the desired burning rates.

Accordingly, an object of this invention is to increase the accuracy capability of ballistic missiles by providing a solid propellant rocket motor with selectable and dual thrust levels for smooth termination of the thrust thereof.

Another object of this invention is to provide a system that utilizes thrust zoning and thrust termination at preset missile accelerations to accurately control the missile to a predetermined target.

A further object of this invention is to provide a nozzle for a rocket motor that can be varied in throat area and configuration during flight of a missile to provide accurate thrust zoning and thrust termination of the missile.

A still further object of this invention is to reduce the thrust peak as a result of thrust termination to a minimum by thrust terminating in two steps.

In accordance with this invention, a new missile system is provided that includes a missile which has an accelerometer control device mounted therein and a motor with a variable configuration nozzle. The nozzle has serially arranged sections that are separable from each other and from the motor by explosive means which are actuated by command signals from the accelerometer control device. Removal of the nozzle sections thrust zones and terminates the thrust of the missile.

In the accompanying drawing forming a part of this specification, and in which like numerals are employed to designate corresponding parts throughout the same:

FIGURE 1 is an elevational view, partially cutaway, of a missile according to this invention, and
FIGURE 2 is a schematic circuit diagram according to this invention.

This invention may be better understood by referring to the drawing wherein, numeral 1 designates a missile that includes a forward section 3 that contains an accelerometer control device 5 therein, an intermediate section 6, and a rear section 7 that has the motor and nozzle structure of the missile.

The nozzle structure includes a rear venturi nozzle section 9 and a forward venturi nozzle section 11. Forward nozzle section 11 is secured in a conventional manner to the motor by forward flange means 13. The forward flange means 13 contains conventional explosive means 15 (see FIGURE 2) such as explosive bolts, Primacord, or other conventional quick release explosive means (none of which are structurally illustrated) for separating forward nozzle section 11 from the motor at the appropriate time.

Forward and rear nozzle sections 9 and 11 are secured together in a conventional manner by rear flange means 17. Rear flange means 17 contains explosive means 19 (see FIGURE 2) like those of the forward flange means 13 to separate rear nozzle section 9 from forward nozzle section 11 at the appropriate time.

The nozzle has a venturi throat section 21 that includes a carbon insert throat section 23, a heat shield 25, an erodable throat section 31 of aluminum or some other equally erodable material, and insulation means 33. Heat shield 25 has a forward portion 27 connected in a conventional manner to insulation means 33 to protect the erodable throat section, a turned back portion 28 to protect carbon insert 23 and a rear portion 29 for securement in rear flange means 17.

In operation, accelerometer control device 5 is set in a conventional manner to send a first signal by way of lead 18 (see FIGURE 2) to explosive means 19 at a first acceleration of the missile and to send a second signal by way of lead 14 (see FIGURE 2) to explosive means 15 at a second acceleration of said missile. When the missile is launched and reaches said first acceleration, said first signal is sent to explosive means 19, and explosive means 19 will explode and release rear nozzle section 9 allowing carbon insert 23 and heat shield 25 to be blown out. Forward portion 27 of heat shield 25 is made of such material and so designed as to either break up and pass through the erodable throat section or to contract and pass through erodable throat section 31. As the carbon insert and heat shield are blown out, erodable throat section 31 is exposed to the hot gases from the motor which cause erodable throat section 31 to be eroded away in a few milliseconds. With erodable throat section 31 gone, the throat area of the remainder of the nozzle will be larger, and the motor will be operating at a considerably lower thrust and chamber pressure. Within a few milliseconds after erodable throat section 27 is gone, the thrust of the motor is terminated by said second signal from said accelerometer control device that causes actuation of explosive means 15 and separation of forward nozzle section 11 from the motor. With forward nozzle section 11 separated from the motor, the thrust of the motor will be terminated, and the motor chamber pressure will be the prevailing ambient pressure.

By thrust terminating at reduced thrust and chamber pressure levels, the thrust peak resulting from the thrust termination operation is reduced by several orders of magnitude. This decrease in thrust peak allows a much greater accuracy for the missile.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

I claim:

1. A system for transporting a payload between a preselected position and a target comprising: a missile; a motor in said missile; a nozzle; said nozzle being made in sections and secured in serial relation to said motor; explosive means mounted relative to said motor and said nozzle for separating said nozzle sections and for separating said nozzle from said motor; and an accelerometer control device mounted in said missile and connected to said explosive means for causing explosion thereof at two different accelerations of said missile to first separate said nozzle sections and then separate the remaining nozzle section from said motor.

2. A system as set forth in claim 1, wherein said nozzle sections are secured together in the area of the throat of said nozzle, and said throat includes an outer erodable material throat section, an intermediate heat shield and an inner carbon insert.

3. A system as set forth in claim 1, wherein said nozzle sections are secured together by flange means, said nozzle and motor are secured together by flange means, and said explosive means is mounted in each of said flange means.

4. A missile system for transporting a payload between a launching point and a preselected target comprising a missile, said missile including a rocket motor mounted in said missile with a nozzle attached thereto, said nozzle including a series of sections arranged in serial relation and disposed for sequential removal during flight of said missile, and means mounted on said missile and disposed relative to said sections for sequentially removing said nozzle sections in response to preselected accelerations of said missile to control the flight trajectory thereof.

5. A missile system as set forth in claim 4, wherein said means includes an accelerometer control device and explosive means for sequentially removing said nozzle sections.

6. A missile system as set forth in claim 4, wherein said sections are secured together at the throat of said nozzle, and said throat is made up to include an inner carbon insert, an intermediate heat shield, an an outer erodable throat section.

7. A missile system for the transporting of a payload between a launching point and a target comprising: a missile including a motor housing and a nozzle serial thereto and provided with sections to provide said missile with thrust; means for separating said sections one from the other and said nozzle from said motor housing; and an accelerometer control device secured to said missile and connected to said means for separating said sections and said nozzle from said motor housing for gradual reduction of said thrust by separation of said sections and termination thereof responsive to the reduction to predetermined values of the thrust by separation of said nozzle from said motor housing.

8. A thrust zoning and termination system for a solid propellant free flight missile comprising: a rocket motor including a nozzle provided with portions in serial relationship, said portions including two portions that are joined together at the throat of said nozzle, said throat including erodable throat means that is exposed to the hot gases from said rocket motor when a first of said two portions is removed; and explosive means disposed relative to said portions and said motor for sequentially removing said nozzle portions to zone and terminate the thrust levels of said rocket motor.

9. A thrust zoning and termination system as set forth in claim 8, wherein said throat further includes an inner carbon insert, and a heat shield between said carbon insert and said erodable throat means.

10. A thrust zoning and termination system as set forth in claim 9, wherein said heat shield has a portion that is connected to insulation means upstream from said carbon insert to protect said erodable throat means from the hot gases of said rocket motor and a portion that covers a forward edge of said carbon insert.

References Cited by the Examiner

UNITED STATES PATENTS

| | | | |
|---|---|---|---|
| 2,952,972 | 9/1960 | Kimmel et al. | 60—35.6 |
| 3,034,293 | 5/1962 | Ferris et al. | 102—49 |
| 3,122,098 | 2/1964 | Glennan | 102—49 |
| 3,185,096 | 5/1965 | Daudelin | 102—49 |

BENJAMIN A. BORCHELT, *Primary Examiner.*

SAMUEL FEINBERG, *Examiner.*

V. R. PENDEGRASS, *Assistant Examiner.*